United States Patent [19]

Galal et al.

[11] 4,397,926

[45] Aug. 9, 1983

[54] PREPARATION OF CHEESE ANALOGS FROM COMBINATIONS OF ACID CASEIN AND RENNET CASEIN

[75] Inventors: Mostafa K. Galal, Liverpool, N.Y.; William C. Haines, Rochester, Mich.; Beverly I. Roberto, Syracuse, N.Y.

[73] Assignee: Borden, Inc., Columbus, Ohio

[21] Appl. No.: 327,230

[22] Filed: Dec. 3, 1981

[51] Int. Cl.³ .............................................. A23C 20/00
[52] U.S. Cl. .................................... 426/582; 426/585
[58] Field of Search ............... 426/104, 582, 585, 519, 426/657, 36, 39

[56] References Cited

U.S. PATENT DOCUMENTS

| | | | |
|---|---|---|---|
| 2,103,304 | 12/1937 | Teller et al. | 426/582 |
| 3,694,219 | 9/1972 | Glandorf et al. | 426/582 X |
| 3,922,374 | 11/1975 | Bell et al. | 426/582 |
| 4,055,555 | 10/1977 | Badertscher et al. | 426/657 X |
| 4,075,360 | 2/1978 | Rule et al. | 426/582 |
| 4,110,484 | 8/1978 | Rule et al. | 426/582 |
| 4,197,322 | 4/1980 | Middleton | 426/582 X |
| 4,213,896 | 7/1980 | Davis | 260/119 |

FOREIGN PATENT DOCUMENTS

| | | | |
|---|---|---|---|
| 2342299 | 4/1975 | Fed. Rep. of Germany | 426/582 |
| 2428221 | 1/1976 | Fed. Rep. of Germany | 426/582 |
| 2808303 | 8/1978 | Fed. Rep. of Germany | 426/582 |
| 56-68349 | 6/1981 | Japan | 426/582 |

OTHER PUBLICATIONS

"Edible Rennet Casein", New Zealand Dairy Board, Mar. 1977, pp. 13 & 14.

*Primary Examiner*—Arthur L. Corbin
*Attorney, Agent, or Firm*—Robbins & Laramie

[57] ABSTRACT

A cheese analog and processes for making it. The casein content comprises a combination of rennet casein and acid casein. The process involves forming a paste of rennet casein with a melting salt solution, blending acid casein with the paste until the acid casein is completely dispersed, adding edible oil and other conventional ingredients to the blend and cooking and mixing until a homogeneous, smooth plastic mass is obtained, and then cooling the mass to form the product.

13 Claims, No Drawings

PREPARATION OF CHEESE ANALOGS FROM COMBINATIONS OF ACID CASEIN AND RENNET CASEIN

BACKGROUND OF THE INVENTION

1. Field of the Invention

The present invention relates to cheese analogs produced by using combinations of rennet casein and isoelectric casein. These products are not always readily available, and it would be advantageous to be able to use combinations of them in the preparation of cheese analogs. In the past it has always been thought necessary to use either one of these materials or the other, exclusively, because they are not compatible with each other.

2. Background

Casein is a by-product of the dairy industry and is usually prepared from skim milk. There are several methods for isolating casein from milk. The physical properties and chemical composition of the casein obtained depend upon the source of the milk and its quality, and upon the method of preparation of the casein.

There are two principal methods for producing casein from milk. These are acid precipitation of casein at its isoelectric point, which is about pH 4.7, and enzyme coagulation by the action of rennin or other suitable enzyme.

Ideally, casein, no matter how produced, would be tasteless, odorless, and noncrystalline. In fact, isoelectric casein produced by acid precipitation may have an objectionable taste and mouthfeel. A number of techniques have been devised, therefore, for treating isoelectric casein (hereafter, acid casein) in order to improve its properties to make it suitable for use in the production of cheese analogs.

Rennet casein is often preferred to isoelectric casein for many food uses because of its bland flavor.

3. Description of the Prior Art

The Bell et al. U.S. Pat. No. 3,922,374, describes a process for making a cheese analog from raw materials including acid casein and fat. In this process, finely divided acid casein was mixed with an aqueous solution of acid, then high shear was applied while calcium hydroxide was added. The resulting calcium caseinate was mixed with fat and other conventional cheese analog ingredients, still using high shear mixing and subatmospheric pressure, to form a cheese analog blend. Rennet casein could not be used in this process, as either a partial or complete replacement for the acid casein, because it would not be solubilized by this kind of processing.

The Middleton U.S. Pat. No. 4,197,322, describes a somewhat different process for producing a cheese analog. In the Middleton process, acid casein was solubilized at a pH above 7.0, and subsequently reprecipitated by acidification, to produce a wet calcium caseinate curd. The curd was then blended with oil and other cheese analog ingredients to form the cheese analog product. As was the case with the Bell et al. process, the Middleton et al. process cannot be used successfully with rennet casein. In addition, the Middleton et al. process requires a curd-forming step, which entails additional labor and processing costs as compared to the Bell et al. process.

Rennet casein has better flavor and flavor retention characteristics than acid casein, and it is only natural that it has been tried for use in the producttion of cheese analogs. In German Pat. No. 2,808,303, Bixby et al. disclose a process that requires the use of cheese melting salts to solvate rennet casein in water, at or above a threshold temperature. It would not be possible to use a combination of acid casein and rennet casein in the Bixby et al. process, because the acidic nature of the acid casein would interfere with the solvation of the rennet casein, so that an acceptable cheese analog could not be produced.

SUMMARY OF THE INVENTION

The present invention is a novel cheese analog product and process for making it. The product is formed using a combination of acid casein and rennet casein, together with oil and other conventional ingredients used in cheese analog production. The combined, total casein content of the product is from about 15% to 30% by weight of the product, if no other protein components are employed. Generally the total protein component in a cheese analog will not exceed about 30% of the product by weight. Preferably at least 50% of the total amount of casein employed is rennet casein, because of its superior flavor and flavor retention characteristics. The acid casein is preferably either lactic acid casein, hydrochloric acid casein, or sulfuric acid casein.

The process of making the cheese analog product involves forming a paste of rennet casein with a melting salt solution at an elevated temperature from about 110° F. (43° C.) to about 150° F. (66° C.). Acid casein is then blended with this paste, while still at an elevated temperature, until the acid casein is completely dispersed. The edible oil and other conventional cheese analog ingredients are then added to the blend, and mixed at a temperature of 165° F. (74° C.) to 180° F. (82° C.). Mixing is continued until a homogeneous, smooth plastic mass is obtained. This may then be poured into packages, such as packages that will form the mass into cheese analog loaves, and then cooled.

DETAILED DESCRIPTION OF THE INVENTION

The availability of acid casein and of rennet casein from commercial sources is sometimes uncertain. The present invention has the important advantage of permitting these two types of casein to be used in combination. The particular proportions in which they are used may differ in order to permit the continuation of production despite fluctuations in the availability of either type of casein. Use of the invention results in the production of highly acceptable cheese analog products in an economical fashion, without the need for a curd making step.

The invention involves the discovery that a precise sequence of steps makes it possible to use both rennet casein and acid casein, in combination, to produce acceptable cheese analog products.

In the process, certain common cheese melting salts, such as, for example, disodium phosphate, trisodium phosphate, sodium tripolyphosphate, and the like, are dissolved in water. The solution is carefully mixed and heated to a temperature up to about 150° C. until the melting salts are either completely dissolved or are thoroughly dispersed.

Rennet casein is then added, and mixing is continued until a thick, somewhat grainy paste is produced. This step of the process may be accelerated by initially adding a small amount of sodium hydroxide or calcium hydroxide to the melting salts.

After the paste has formed, the acid casein is added and mixing is continued. It is important that all of the rennet casein particles have been dissolved before addition of the acid casein, since if the rennet casein is not completely dissolved, particles of it will be present in the finished cheese analog product.

After the acid casein has been completely mixed with the paste, the remainder of the ingredients for the cheese analog formulation, including an edible oil, are added and blended in. Mixing is continued while the material is heated to a temperature in the range from about 160° F. (71° C.) to about 190° F. (88° C.), and preferably 165° F. (74° C.) to 180° F. (82° C.), or more preferably, from 165° F. (74° C.) to 175° F. (79° C.). Mixing and heating are continued until a homogeneous, smooth plastic mass is produced. At this point any necessary pH adjustment, not already made, may be completed. Generally this involves the blending in a small amount of lactic acid or the like, to adjust the pH to the range 5.4 to 6.0. Flavors and colorants may also be added at this time.

The plastic mass is then processed and packaged in the same manner as conventional process cheeses and cheese foods. For example, to make a cheese loaf, the plastic mass is poured into lined boxes, covered, and cooled.

A representative formulation may be selected from the list of ingredients presented in Table 1, below.

TABLE 1

| Representative Ingredients for Producing a Cheese Analog | |
|---|---|
| Ingredient | % |
| Rennet Casein | 1-30 |
| Isoelectric Casein | 1-30 |
| Vegetable Oil | 8-32 |
| Melting Salts[1] | 0.5-3 |
| Sodium Chloride | 1.0-2.5 |
| Cheese | 0-51 |
| Non-Fat Dry Milk Solids | 0-3 |
| Starch | 0-0.1 |
| Whey Solids | 0-12 |
| Gums | 0-0.1 |
| Acidulent[2] | 0-0.5 |
| Natural and Artificial Flavors | 0-2 |
| Enzyme Modified Cheese | 0-1.5 |
| Calcium or Sodium Hydroxide | 0-0.1 |
| Colorants | 0-0.1 |
| Water | 15-50 |

[1]Disodium Phosphate, Trisodium Phosphate, Sodium Tripolyphosphate, Sodium Hexametaphosphate, Sodium Pyrophosphate, Kasal brand of Sodium Aluminum Phosphate, and/or Sodium Citrate.
[2]Lactic, Phosphoric, Acetic, Citric, and/or Adipic Acids (to adjust final pH to 5.4-6.0).

The formulation in Table 1 is representative rather than comprehensive. For example, it is a common but not essential practice to add natural cheese to a cheese analog. This may be done to enhance the flavor, color, and/or texture of the cheese analog, for example. The cheese analog products produced in accordance with the present invention can, as is common practice, have substantial amounts of natural cheese or of rework cheese analog incorporated therein. Preferably the amount of cheese added to the cheese analog product will not exceed about 51% by weight of the product, for reasons of economy.

Cheese analogs generally are prepared to contain about 30% by weight of one or more protein components. Those protein components commonly employed, generally in some combination, include casein in some form, non-fat milk (NFDM) solids, whey solids, cheese, cheese analog that is being salvaged or reworked, and the like. The use of a casein combination in accordance with this invention can provide some or all of the requisite protein component. If one or more other protein components is used, then the total generally should not exceed 30% by weight of the product. If the combination of rennet casein and acid casein constitutes the sole protein component, then the total casein should be in the range from about 15% to about 30% by weight of the product.

In formulating the cheese analog, there are several other important formulating considerations. For example, there must be sufficient water present to insure complete solvation of the casein. Generally, the total amount of casein (of both kinds) should not exceed 65% of the total amount of water, by weight, in the formulation, for this reason.

Table 1 above must be interpreted with the understanding that the total amount of casein, including both the rennet casein and the acid casein, should not exceed about 30% by weight of the cheese analog product, assuming no other protein component is present. Within this total amount, the relative proportions of rennet casein to acid casein may be selected at will. If ample supplies of each are available, generally it is preferred that the rennet casein provide at least 50% of the total amount of casein by weight, because of flavor considerations. Acid casein is more prone to the development of off flavors during storage than is rennet casein.

While the acid casein may be any commercially available product, it is preferred that it be a lactic acid casein, hydrochloric acid casein, of sulfuric acid casein.

The vegetable oil component may be of any edible type. The preferred kind of vegetable oil is one with a bland flavor that has physical characteristics similar to those of butter fat.

The melting salts, which are sometimes referred to as emulsifying salts, should amount to at least 3% by weight of the total amount of casein employed, but generally should not exceed 15%. In addition, the total amount of melting salts present should be at least 5% by weight based on the amount of rennet casein present.

To make a cheese analog product in accordance with the invention, the required water is preheated to a temperature in the range from about 110° F. to about 150° F. The melting salts are then mixed with the heated water in a steam injection mixer-cooker.

When the melting salts are thoroughly dispersed or dissolved, the rennet casein is added and mixing is continued until a slightly grainy paste results. Generally this requires about 10 minutes of mixing. It is believed that this step in the process results in at least partial solvation of the rennet casein.

In these initial steps, less time is required if the water is preheated to 150° F. Lower temperatures may be used where time is not a significant factor. For example, ambient temperature may be used in the initial step of making a solution or dispersion of the melting salts, but there is a concomitant increase in the time required. Similarly, ambient temperature may be used for the step of mixing the rennet casein with the water and melting salts, but the time required for complete solvation of the rennet casein is substantially increased. On the other hand, temperatures above 150° F. are not helpful, and in fact may cause problems, since if the rennet casein hydrates completely too rapidly, there may not be a sufficient amount of free moisture for the next step, where moisture is required to hydrate the acid casein.

Processing time may also be decreased by adding to the water, along with the melting salts, calcium hydroxide or sodium hydroxide. The amount of such an alkaline material employed, if used, can be up to 0.5% by weight based on the casein. As the amount of alkali employed is increased, the rate of solvation of the casein is increased. However, the pH of the final cheese analog product should be in the range from 5.4 to 6.0, which generally requires the addition of an acidulent during the final stages of processing. When an alkali is used to speed up the process, there must be a corresponding increase in the amount of acidulent in order to adjust the pH to the desired level.

After the mixture of rennet casein in the melting salt-water mixture has been converted to a slightly grainy paste, the acid casein is added to the mixer-cooker. Mixing is then continued until the acid casein is completely dispersed. Generally this requires about one minute of mixing. Generally the temperature for this step should be about the same temperature employed for forming the paste with the rennet casein.

Once the acid casein is completely dispersed, all of the remaining ingredients of the formulation may be added, although generally it is desirable to add the acid for pH adjustment, and any flavorant, toward the end of the final cooking phase. Mixing is then continued while heat is applied so that the temperatures are in the range, preferably, from about 165° F. to about 180° F. Lower temperatures may be used, but then a somewhat longer holding time in the cooker may be required to develop the proper plasticity. Similarly, higher temperatures may be employed, but then a longer time is required after packaging, to effect proper cooling. Preferably the heating is accomplished by the injection of live steam, to heat the mass to about 170° F. The steam is turned off when the proper temperature has been attained, but mixing is continued thereafter, if necessary, until the mass becomes smooth and plastic. Generally this final mixing can be terminated within about two minutes after the steam has been turned off.

The smooth plastic mass is then removed from the mixer-cooker. It is packaged and cooled in either sliced or loaf form, according to conventional procedures used for process cheeses.

When a natural cheese is to be incorporated in the cheese analog product, it may be added to the mixer-cooker along with the vegetable oil and other ingredients. The term "oil" is used herein to refer to both oils and fats, and mixtures thereof. The intent is to refer to an oleaginous material that is essentially liquid in form as used, so that the mixing steps are readily accomplished with a minimum expenditure of energy.

The invention will now be further explained in detail by the following examples, which represent actual demonstrations of the invention. Throughout this specification, including the examples, all parts and percentages are by weight unless expressly stated to be otherwise.

EXAMPLE 1

Cheese Analog Simulating a Pasteurized Process Cheese Spread

A good quality cheese analog was produced that simulated a pasturized process cheese spread, using the ingredients tabulated below in Table 2.

TABLE 2

| Cheese Analog Simulating a Pasteurized Process Cheese Spread | |
|---|---|
| Ingredient | % |
| Rennet Casein | 6.52 |
| Hydrochloric Acid Casein | 6.52 |
| American Cheese | 7.20 |
| Swiss Cheese | 3.12 |
| Partially Hydrogenated Soy Oil | 16.58 |
| Salt | 2.05 |
| Whey Powder | 9.23 |
| NFDM Powder | 1.59 |
| Sorbic Acid | 0.17 |
| Disodium Phosphate | 1.70 |
| Tricalcium Phosphate | 0.44 |
| Lactic Acid | 0.29 |
| Water | 32.76 |
| Steam Condensate | 6.38 |
| Imitation Cheese Spread Salvage | 5.45 |

To make the cheese analog, the water was warmed to 150° F., then disodium phosphate was added. The solution was transferred to a mixer-cooker, and the rennet casein was added. This was mixed until a grainy paste formed.

The acid casein was then added with agitation until dispersed. Thereafter, the remaining ingredients, other than the lactic acid, were added and the agitation was continued as steam was injected to raise the temperature to approximately 170° F. At that point, lactic acid was added to adjust the pH to approximately 5.8. The steam was turned off and agitation was continued to achieve a smooth plastic mass.

The plastic mass was poured into packages, and the packaged product was cooled overnight in a refrigerator. The resulting cheese analog product had good texture.

EXAMPLE 2

Cheese Analog Product Simulating Processed American Cheese

This cheese analog product was formulated from the following ingredients:

TABLE 3

| Cheese Analog Formulation Simulating Processed American Cheese | |
|---|---|
| Ingredient | % |
| Rennet Casein | 12.40 |
| Hydrochloric Acid Casein | 8.30 |
| Partially Hydrogenated Soybean Oil | 24.60 |
| American Cheese | 10.90 |
| Water | 39.24 |
| Tricalcium Phosphate | 1.00 |
| Salt | 1.40 |
| Disodium Phosphate | 1.50 |
| Kasal | 0.37 |
| Potassium Sorbate | 0.15 |
| Color | 0.08 |
| Artificial Flavor | 0.06 |

To make this product, the disodium phosphate and water were mixed at ambient temperature. The rennet casein was then added and blended until the mixture was thick and fluffy, which required approximately three minutes. The acid casein was then added and mixing was continued until particles were no longer visible, which required about four minutes.

The remaining ingredients were then added to the mixer-cooker, mixing was continued, and steam was injected until a temperature of 165° F. was attained. The resulting smooth plastic mass was poured into packages and cooled.

The finished cheese analog product simulated well the physical and organoleptic characteristics of processed American Cheese.

EXAMPLE 3

Analog of Mozzarella Cheese

The following cheese analog formulation was employed:

TABLE 4

| Formulation for a Mozzarella Cheese Analog | |
|---|---|
| Ingredient | % |
| Rennet Casein | 19.02 |
| Hydrochloric Acid Casein | 4.75 |
| Partially Hydrogenated Soy Oil | 23.33 |
| Cheddar Cheese | 1.88 |
| Salt | 1.72 |
| Imitation Mozzarella Salvage | 1.57 |
| Lactic Acid | 0.78 |
| Disodium Phosphate | 0.75 |
| Kasal | 0.79 |
| Calcium Hydroxide | 0.18 |
| Potassium Sorbate | 0.12 |
| Starch | 0.09 |
| Sodium Citrate | 0.06 |
| Guar Gum | 0.01 |
| Water | 44.69 |
| Artificial Flavors | 0.26 |

These ingredients were processed in the following way. The water, disodium phosphate, sodium citrate, and calcium hydroxide were mixed together at ambient temperature. The rennet casein was added and mixing was continued until a thick, fluffy paste resulted.

The acid casein was then added, and mixing was continued until no particles were visible. The remaining ingredients, except flavoring and lactic acid, were then blended into the mixture, agitation was continued, and steam was injected until the temperature reached 170° F. The flavoring and lactic acid were then added.

The resulting smooth plastic mass was then poured hot into lined boxes, to form loaves of the product. These loaves were then covered and cooled in a refrigerator.

The finished product, after chilling, was an acceptable mozzarella cheese analog.

EXAMPLE 4

Analogs Simulating Pasteurized Processed Cheese Food

Two different formulations, reported below in Table 5, were prepared into two different cheese analog products, to permit a comparison.

TABLE 5

| Cheese Analog Formulations for Flavor and Texture Comparisons | | |
|---|---|---|
| Ingredient | Example 4A, % | Example 4B, % |
| American Cheese | 9.92 | 10.08 |
| Partially Hydrogenated Soy Oil | 15.89 | 16.12 |
| Whey Powder | 7.91 | 8.06 |
| Sodium Citrate | 2.58 | 2.62 |
| Natural and Artificial Flavor | 1.99 | 2.02 |
| Salt | 1.39 | 1.41 |
| Enzyme Modified Cheese | 0.99 | 1.01 |
| Disodium Phosphate | 0.70 | 0.70 |
| Autolyzed Yeast Extract | 0.50 | 0.50 |
| Sorbic Acid | 0.20 | 0.20 |

TABLE 5-continued

| Cheese Analog Formulations for Flavor and Texture Comparisons | | |
|---|---|---|
| Ingredient | Example 4A, % | Example 4B, % |
| Citric Acid | 0.42 | 0.42 |
| Water | 39.80 | 40.40 |
| Calcium Hydroxide | 0.09 | 0.09 |
| Artificial Color | 0.07 | 0.87 |
| Rennet Casein | 16.72 | 0.89 |
| Hydrochloric Acid Casein | 0.80 | 15.41 |

The processing procedure for each batch was the same. The disodium phosphate, calcium hydroxide, and one-fifth of the sodium citrate were mixed with the water at 100° F. The rennet casein was added and mixed until there was no evidence of hard particles in the mixture, indicating hydration of the rennet casein. The acid casein was then added and the contents of the mixer-cooker were agitated until no particles were evident. The oil was added first, then the color, and then the rest of the ingredients were added and mixed thoroughly. The product was cooked to 170° F. under agitation. The cooked product was poured into loaves and cooled at 45° F.

The cheese analog products produced by both batches simulated pasteurized process cheese food very well. The cheese analog product of Example 4A was preferred for flavor and texture.

CONCLUSION

The foregoing examples demonstrate that satisfactory cheese analog products can be made where the casein content is derived from combinations of rennet casein and acid casein using widely different proportions of one to the other. The different proportions employed in the examples above are summarized below in Table 6; sources of protein other than casein are not taken into account in this table.

TABLE 6

| Example | Total Casein as % of Final Product | Percent Rennet Casein Based on | | Percent Acid Casein Based on | |
|---|---|---|---|---|---|
| | | Total Casein | Final Product | Total Casein | Final Product |
| 1 | 13.04 | 50.0 | 6.52 | 50.0 | 6.52 |
| 2 | 20.70 | 59.9 | 12.40 | 40.1 | 8.30 |
| 3 | 23.77 | 80.0 | 19.02 | 20.0 | 4.75 |
| 4A | 17.52 | 95.4 | 16.72 | 4.6 | 0.80 |
| 4B | 16.3 | 5.5 | 0.89 | 94.5 | 15.41 |

It is a substantial advantage to the manufacturer of cheese analogs to be able to use both types of casein together. Past procedures have not permitted this. Another advantage of the invention is that no curd forming step is required, so that the process is simple and efficient.

While the invention may be practiced where the acid casein and the rennet casein each contribute as little as 1% to the final product by weight, respectively, when at least one other protein component is present to provide the requisite protein, i.e. from about 15% to about 30% by weight of the final product, generally more casein will be present for practical reasons. When cheese is added, it serves not only as a protein component but also contributes oil (fat), salts, and moisture, and generally may also affect aroma, flavor, and texture, and may also affect pH. The experienced formulator will ordinarily take all of these factors into account.

The order of steps in the process is important, in that the rennet casein must be hydrated before the acid casein is dispersed. However, steps can be taken to modify each phase of the process. Thus, for example, the addition of all or a part of the tricalcium phosphate, if used, along with the melting salts, or just after hydration has started, assists in the hydration.

While the invention has been disclosed in this patent application by reference to the details of preferred embodiments of the invention, it is be understood that this disclosure is intended in an illustrative rather than in a limiting sense, as it is contemplated that modifications will readily occur to those skilled in the art, within the spirit of the invention and the scope of the appended claims.

What is claimed is:

1. A process for making a cheese analog product comprising
    mixing rennet casein with a melting salt solution at an elevated temperature of from about 110° F. (43° C.) to about 150° F. (66° C.) until the rennet casein has dissolved to form a paste,
    blending acid casein with said paste until the acid casein is completely dispersed,
    adding an edible oil and other conventional ingredients of a cheese analog to said blend and mixing at an elevated temperature of from 160° F. (71° C.) to 190° F. (88° C.) until a homogeneous, smooth plastic mass is obtained, and then
    cooling the mass to form the cheese analog product.

2. The process of claim 1 wherein the total protein content of the product is about 30% by weight, of which the acid casein and the rennet casein each contribute at least 1% by weight, respectively, the percentages being based on the cheese analog product.

3. The process of claim 2 wherein the total amount of casein in the product is not above 65% by weight of the total water in the product.

4. The process of claim 3 wherein the amount of rennet casein present is at least one-half of the total amount of casein in the product.

5. The process of claim 1, 2 or 3 wherein either sodium or calcium hydroxide is included in the melting salt solution in an amount up to 0.5% by weight of the total casein in the product.

6. The process of claim 5 wherein the pH of said smooth plastic mass is adjusted to from about 5.4 to about 6.0 prior to cooling.

7. The process of claim 1, 2 or 3 wherein the pH of said smooth plastic means is adjusted to from about 5.4 to about 6.0 prior to cooling.

8. The process of claim 1, 2 or 3 wherein the mixing to form the smooth plastic mass is at a temperature in the range from 165° F. (74° C.) to 180° F. (82° C.).

9. The process of claim 1, 2 or 3 wherein the melting salts are present in an amount of from 3% to 15% by weight of the total amount of casein present in the product.

10. The process of claim 9 wherein the melting salts are present in an amount of at least 5% by weight of the rennet casein present in the product.

11. The process for making a cheese analog product consisting of
    mixing rennet casein with a melting salt solution at an elevated temperature of from about 110° F. (43° C.) to about 150° F. (66° C.) until the rennet casein has dissolved to form a paste,
    blending acid casein with said paste until the acid casein is completely dispersed,
    adding an edible oil and other conventional ingredients of a cheese analog to said blend and mixing at an elevated temperature in the range of from 165° F. (74° C.) to 180° F. (82° C.) until a homogeneous, smooth plastic mass is obtained,
    adjusting the pH of the smooth plastic mass to the range of from 5.4 to 6.0, and then cooling the mass to form the cheese analog product,
    the total protein content of the product not exceeding about 30% by weight but including at least 1% by weight of rennet casein and at least 1% by weight of acid casein, all of said percentages being based on the final product, the total amount of casein in the product being up to 65% by weight of the total amount of water in the product, and the weight of melting salts present in the product being at least 3% and up to 15% by weight of the total casein in the product and at least 5% by weight of the rennet casein in the product.

12. The process of claim 11 wherein the melting salt solution includes sodium hydroxide or calcium hydroxide or a mixture thereof in an amount up to 0.5% by weight of the total casein in the product.

13. The process of claim 11 or 12 wherein the amount of rennet casein present is at least 50% by weight of the total amount of casein in the product.

* * * * *